United States Patent
Brakensiek et al.

(10) Patent No.: US 9,164,779 B2
(45) Date of Patent: Oct. 20, 2015

(54) APPARATUS AND METHOD FOR PROVIDING FOR REMOTE USER INTERACTION

(75) Inventors: Jörg Brakensiek, Mountain View, CA (US); Raja Bose, Mountain View, CA (US)

(73) Assignee: Nokia Technologies Oy, Espoo (FI)

( * ) Notice: Subject to any disclaimer, the term of this patent is extended or adjusted under 35 U.S.C. 154(b) by 625 days.

(21) Appl. No.: 13/370,992

(22) Filed: Feb. 10, 2012

(65) Prior Publication Data
US 2013/0212483 A1 Aug. 15, 2013

(51) Int. Cl.
G06F 9/44 (2006.01)
G06F 3/0488 (2013.01)
G06F 15/16 (2006.01)

(52) U.S. Cl.
CPC .......... *G06F 9/4445* (2013.01); *G06F 3/04883* (2013.01); *G06F 15/16* (2013.01)

(58) Field of Classification Search
CPC .............................. G06F 3/04883; G06F 15/16
USPC ......................................................... 715/740
See application file for complete search history.

(56) References Cited

U.S. PATENT DOCUMENTS

| 7,889,175 | B2 | 2/2011 | Kryze et al. |
| 2009/0051648 | A1 | 2/2009 | Shamaie et al. |
| 2009/0153289 | A1 | 6/2009 | Hope et al. |
| 2010/0269039 | A1 | 10/2010 | Pahlavan et al. |
| 2011/0185318 | A1 | 7/2011 | Hinckley et al. |
| 2011/0246891 | A1 | 10/2011 | Schubert et al. |
| 2011/0246904 | A1 | 10/2011 | Pinto et al. |

FOREIGN PATENT DOCUMENTS

EP    2385462 A1    11/2011

OTHER PUBLICATIONS

Torunski, Eric, et al.; "Gesture Recognition on a Mobile Device for Remote Event Generation"; IEEE; 2011.
Nokia N9 UX Guidelines; The Swipe; downloaded at http://harmattan-dev.nokia.com/docs/ux/pages/The_Swipe.html on Jun. 21, 2012; 2 pages.
International Search Report and Written Opinion for Application No. PCT/FI2013/050087, dated Apr. 4, 2013.

*Primary Examiner* — Andrea Leggett
(74) *Attorney, Agent, or Firm* — Alston & Bird LLP

(57) ABSTRACT

An apparatus, method, and computer program product are described that provide for a replicated user interface, including a replicated active display area and a replicated boundary area, such that the replicated user interface can recognize the same types of user inputs that are recognized by a remote user interface, and the same operations may be executed upon receipt of such inputs. The apparatus can establish a communications link with the remote user interface and determine whether the remote user interface is configured to detect a user input at least partially received in a boundary area outside an active display area of the remote user interface. A replicated active display area and a replicated boundary area may then be provided for in response to a determination that the remote user interface is configured to detect a user input at least partially received in the boundary area of the remote user interface.

20 Claims, 12 Drawing Sheets

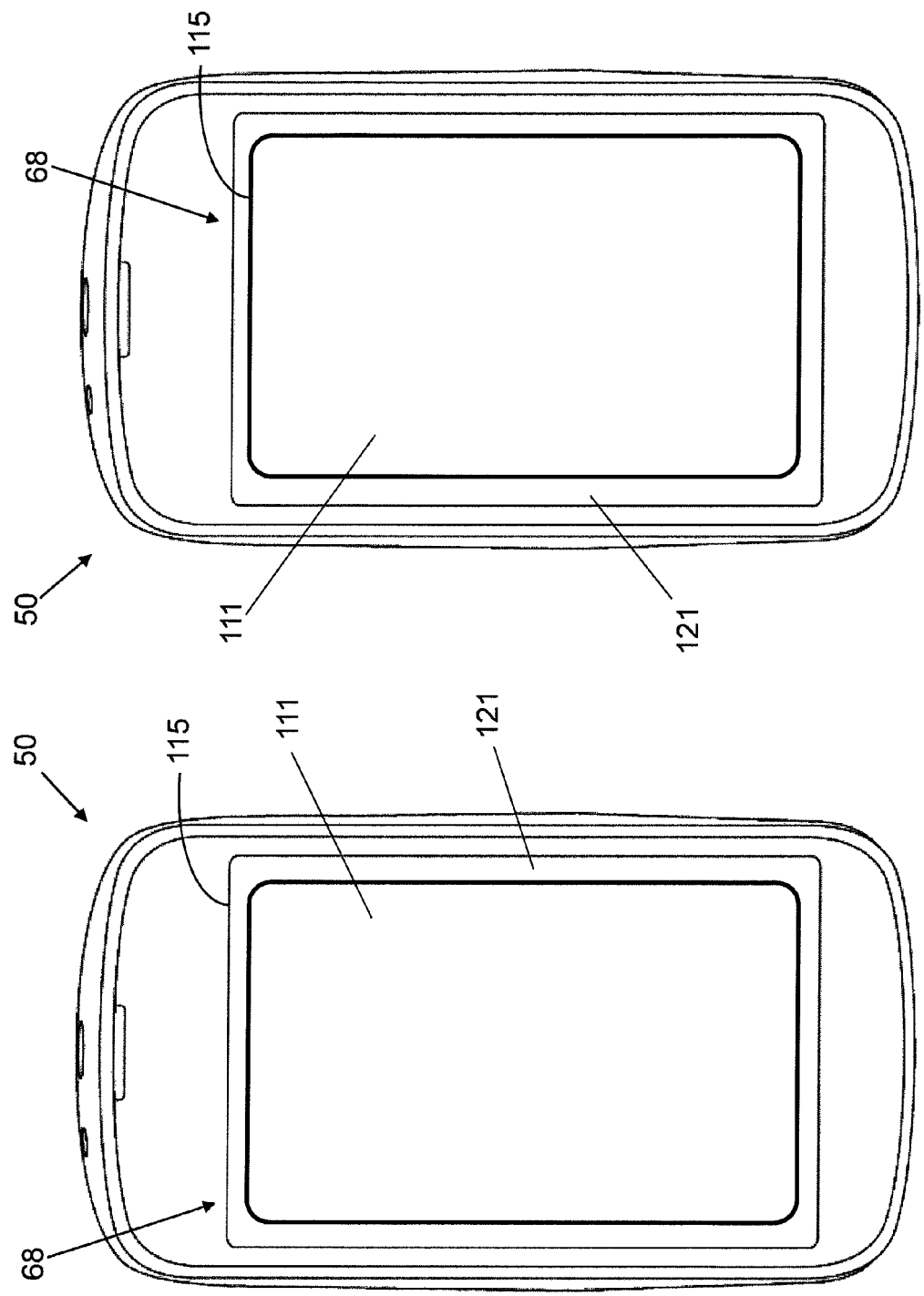

APPARATUS AND METHOD FOR PROVIDING FOR REMOTE USER INTERACTION

TECHNOLOGICAL FIELD

Embodiments of the present invention relate generally to providing a user interface that enables user interaction with a remote user interface by providing for a replicated active display area and a replicated boundary area for receiving user inputs.

BACKGROUND

Mobile devices, such as cellular telephones and portable digital assistants (PDAs), have become increasingly popular with users and are becoming an essential part of many users' everyday lives. In many cases, the mobile devices have the capability of wirelessly communicating with other electronic devices, for example, to exchange information.

Users are often very familiar with their own mobile devices and, given a preference, would rather interact with a user interface provided by their own device than with an unfamiliar user interface of a different device (mobile or fixed). For example, rather than interacting with the user interface provided by a ticket kiosk at a movie theater to purchase tickets, many users would prefer to interact with their own mobile devices to accomplish the same task. In other situations, however, the user may wish to interact with his familiar user interface, but presented on a larger display (such as the display of a remote device).

Accordingly, it may be desirable to provide an improved mechanism for providing a user interface on a particular device that has substantially the same appearance and functionality as the user interface of a remote device.

BRIEF SUMMARY OF EXAMPLE EMBODIMENTS

Accordingly, embodiments of an apparatus, method, and computer program product are described that can provide a replicated user interface. In particular, embodiments of an apparatus for providing for a replicated user interface may include at least one processor and at least one memory including computer program code. The at least one memory and the computer program code may be configured to, with the processor, cause the apparatus to establish a communications link with a remote user interface; determine whether the remote user interface is configured to detect a user input at least partially received in a boundary area outside an active display area of the remote user interface; and provide for a replicated active display area and a replicated boundary area in response to a determination that the remote user interface is configured to detect a user input at least partially received in the boundary area of the remote user interface. In this regard, a user input at least partially received in the replicated boundary area and at least partially received in the replicated active display area may invoke execution of a predetermined operation.

In some cases, the at least one memory and the computer program code may be further configured to, with the processor, cause the apparatus to provide for the replicated active display area by configuring a portion of an existing active display area to serve as the replicated active display area and configuring another portion of the existing active display area to serve as the replicated boundary area. Alternatively, the at least one memory and the computer program code may be configured to, with the processor, cause the apparatus to provide for the replicated active display area by configuring an existing active display area to serve as the replicated active display area and to provide for the replicated boundary area at least partially surrounding the replicated active display area. The replicated active display area may be configured to display content, and the replicated boundary area may be configured not to display content.

In some cases, a user input comprising a touch component initiated at least partially in the replicated boundary area and comprising a movement component at least partially received in the replicated active display area may invoke execution of the predetermined operation. The predetermined operation may comprise a transition from a first screen comprising a first interactive content to a second screen comprising a second interactive content. As another example, the predetermined operation may comprise closing a program displayed in the replicated active display area.

In other embodiments, a method and a computer program product are described for providing for a replicated user interface by establishing a communications link with a remote user interface; determining whether the remote user interface is configured to detect a user input at least partially received in a boundary area outside an active display area of the remote user interface; and providing for a replicated active display area and a replicated boundary area in response to a determination that the remote user interface is configured to detect a user input at least partially received in the boundary area of the remote user interface, where a user input at least partially received in the replicated boundary area and at least partially received in the replicated active display area invokes execution of a predetermined operation.

In some cases, providing for the replicated active display area may comprise configuring a portion of an existing active display area to serve as the replicated active display area and configuring another portion of the existing active display area to serve as the replicated boundary area. In other cases, providing for the replicated active display area may comprise configuring an existing active display area to serve as the replicated active display area and providing for the replicated boundary area at least partially surrounding the replicated active display area. Moreover, the replicated active display area may be configured to display content, and the replicated boundary area may be configured not to display content.

A user input comprising a touch component initiated at least partially in the replicated boundary area and comprising a movement component at least partially received in the replicated active display area may, in some cases, invoke execution of the predetermined operation. The predetermined operation may comprise a transition from a first screen comprising a first interactive content to a second screen comprising a second interactive content, and/or the predetermined operation may comprise closing a program displayed in the replicated active display area.

In still other embodiments, an apparatus is described for providing for a replicated user interface. The apparatus may include means for establishing a communications link with a remote user interface; means for determining whether the remote user interface is configured to detect a user input at least partially received in a boundary area outside an active display area of the remote user interface; and means for providing for a replicated active display area and a replicated boundary area in response to a determination that the remote user interface is configured to detect a user input at least partially received in the boundary area of the remote user interface, where a user input at least partially received in the replicated boundary area and at least partially received in the replicated active display area invokes execution of a predetermined operation.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 8A illustrates an apparatus for which a portion of the existing active display area is configured to serve as the replicated active display area and another portion of the existing active display area is configured to serve as the replicated boundary area according to an example embodiment of the present invention;

Figure 9:
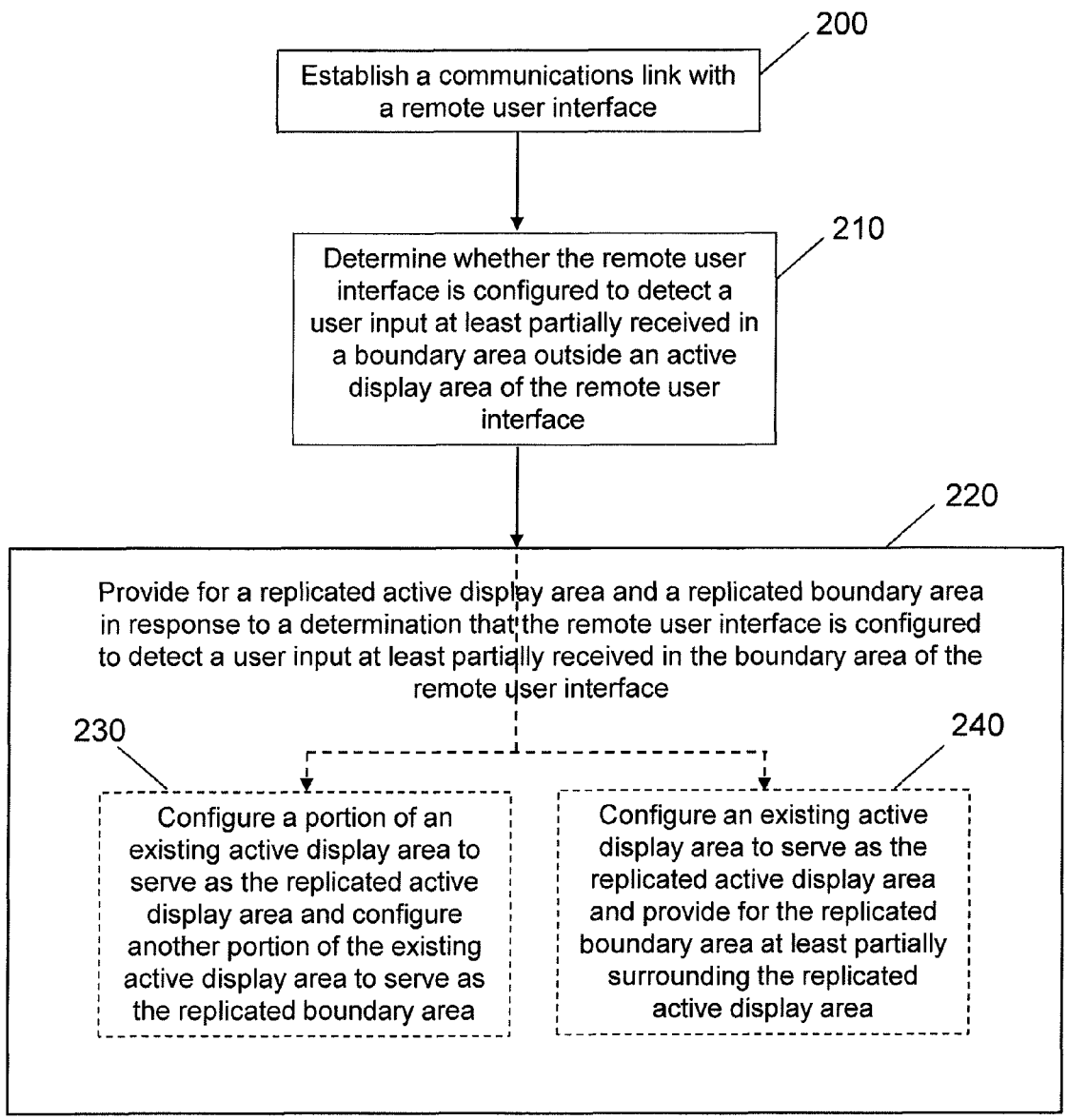

FIG. 8B illustrates an apparatus for which the existing active display area is configured to serve as the replicated active display area and the replicated boundary area is provided at least partially surrounding the replicated active display area according to an example embodiment of the present invention; and FIG. 9 illustrates a flowchart of a method of providing for a replicated user interface according to another example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As noted above, many users prefer to interact with a user interface with which they are familiar, such as the user interface provided by their mobile terminal (e.g., a user device such as portable digital assistants (PDAs) and cellular telephone). In addition to having a familiarity with the appearance of the user interface, such as to know where to apply a user input to elicit the execution of a particular operation, the user likely also enjoys knowing the various functionalities of his user interface.

Figure 3:
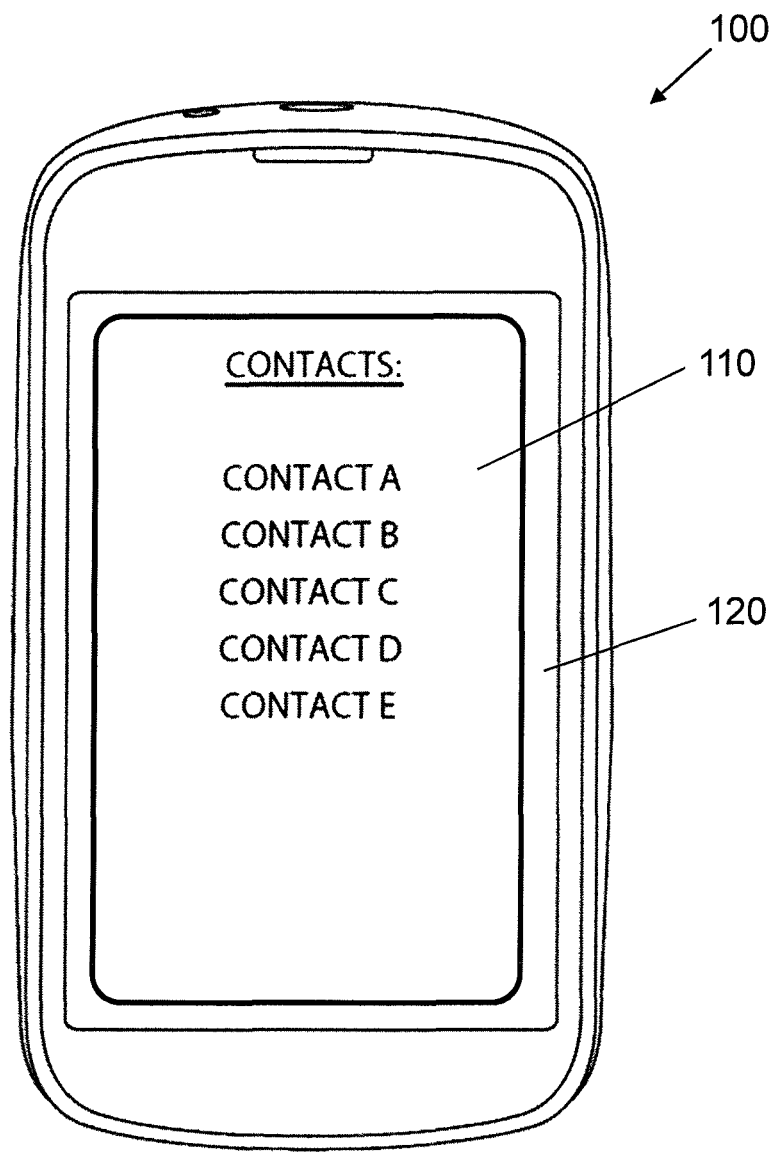
FIG. 3 illustrates a device configured to provide an active display area and a boundary area according to an example embodiment of the present invention.

For example, with respect to a touch screen display, the user device 100 may provide for an active display area 110 and a boundary area 120 outside the active display area, as depicted in FIG. 3. The active display area 110 may, in some cases, be a portion of the touch screen display that is configured to present images to the user, whereas the boundary area 120 may be a darkened or "dead" area surrounding the active display area where no images are presented, but that is capable of receiving touch inputs. In other cases, however, images may be presented in both the active display area and the boundary area.

The user device may be configured to recognize certain user inputs as invoking the execution of particular operations based on where and how the inputs are received on the touch screen display. For example, a "swipe-in" touch gesture may be recognized where the user initiates the input at an edge of the touch screen display (e.g., in the boundary area 120) and moves his finger towards the center of the display (e.g., into the active display area 110). A "swipe-in" gesture may, for example, cause the device to transition between different screens of interactive content, such as to switch from displaying a particular application to displaying the device's home screen. Thus, in order to recognize an input such as a "swipe-in" gesture, touch sensors are provided in both the active display area 110 and the boundary area 120.

When another device communicates with the user device to present, on the other device's display, the same user interface of the user's mobile device, however, one problem that may occur is that the other device may lack the support in its own hardware to detect gestures that rely on detection in both a boundary area and an active display area. In other words, the touch screen display of the other device may not be able to detect a "swipe-in" gesture because the device may not be equipped to present a boundary area in which the "swipe-in"

gesture may be initiated, and a user's attempt to input a "swipe-in" gesture may instead be interpreted as a different gesture invoking a different, unintended operation (such as a panning operation).

Accordingly, embodiments of the present invention provide for a replicated user interface, including a replicated active display area and a replicated boundary area, such that the user interface of the device may be able to recognize the same types of user inputs that are recognized by the remote user interface, and the same operations may be executed upon receipt of such inputs. In this regard, the term "remote user interface" as used herein refers to the device whose user interface is being simulated. Thus, in a case in which the user's mobile device is communicating with another device, such as a kiosk or some other fixed terminal, and the user's mobile device is providing for a user interface that replicates the user interface of the fixed terminal, the fixed terminal would be the remote user interface. Alternatively, in a case in which a fixed terminal is communicating with a user's mobile device so as to provide for display of the user interface of the user's mobile device on the display of the fixed terminal, the user's mobile device would be the remote user interface.

Thus, as described in greater detail below, embodiments of the present invention establish a communications link with a remote user interface and determine whether the remote user interface is configured to detect a user input at least partially received in a boundary area outside an active display area of the remote user interface. A replicated active display area and a replicated boundary area may then be provided for in response to a determination that the remote user interface is configured to detect a user input at least partially received in the boundary area of the remote user interface, where a user input at least partially received in the replicated boundary area and at least partially received in the replicated active display area invokes the execution of a predetermined operation. In this way, a simulated user interface may be provided that has substantially the same capability for recognizing and acting upon received user inputs as the remote user interface, despite a lack of hardware for supporting such functionality directly.

Figure 1:
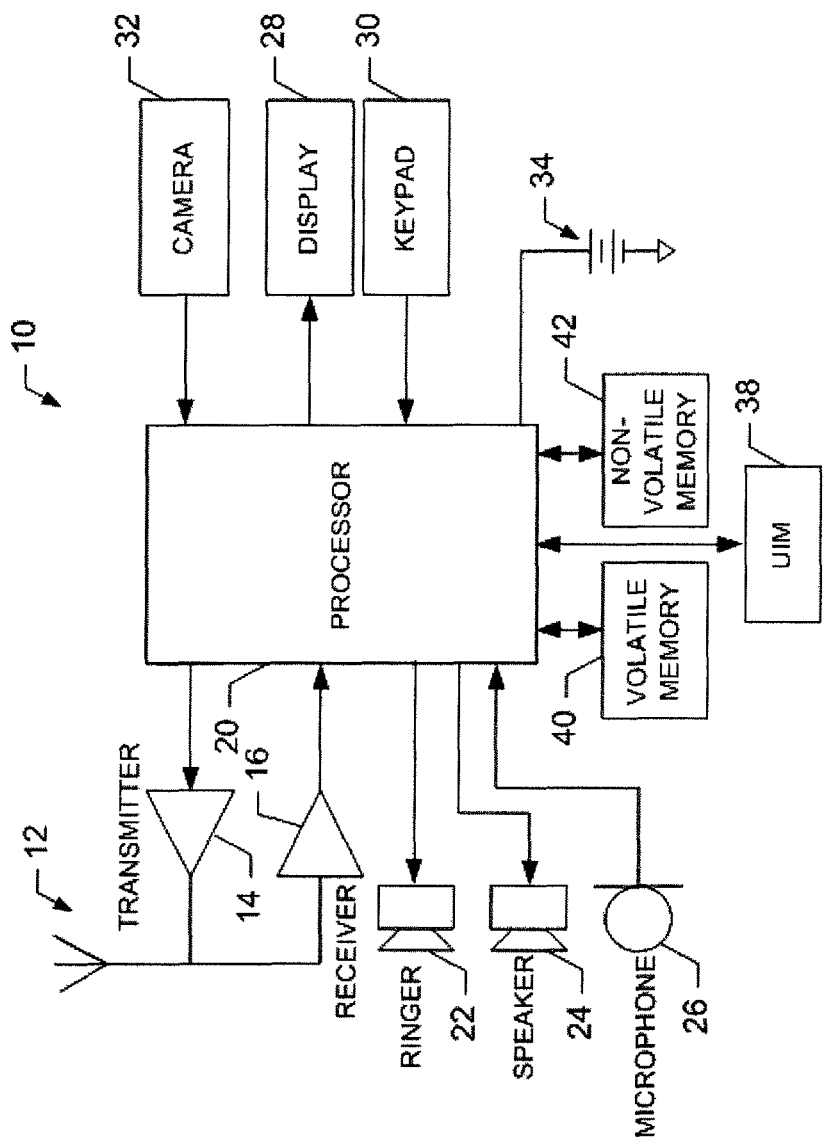
FIG. 1 illustrates one example of a communication system according to an example embodiment of the present invention.

FIG. 1, which provides one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include a proximity component and/or an orientation component, as described below. The signals may further include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element 32 in order to capture images or video of objects, people, and places proximate to the user of the mobile terminal 10. The mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, which depicts certain elements of an apparatus 50 for providing for a replicated user interface. The apparatus 50 of FIG. 2 may be employed, for example, in conjunction with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer, a tablet, a mobile telephone, or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
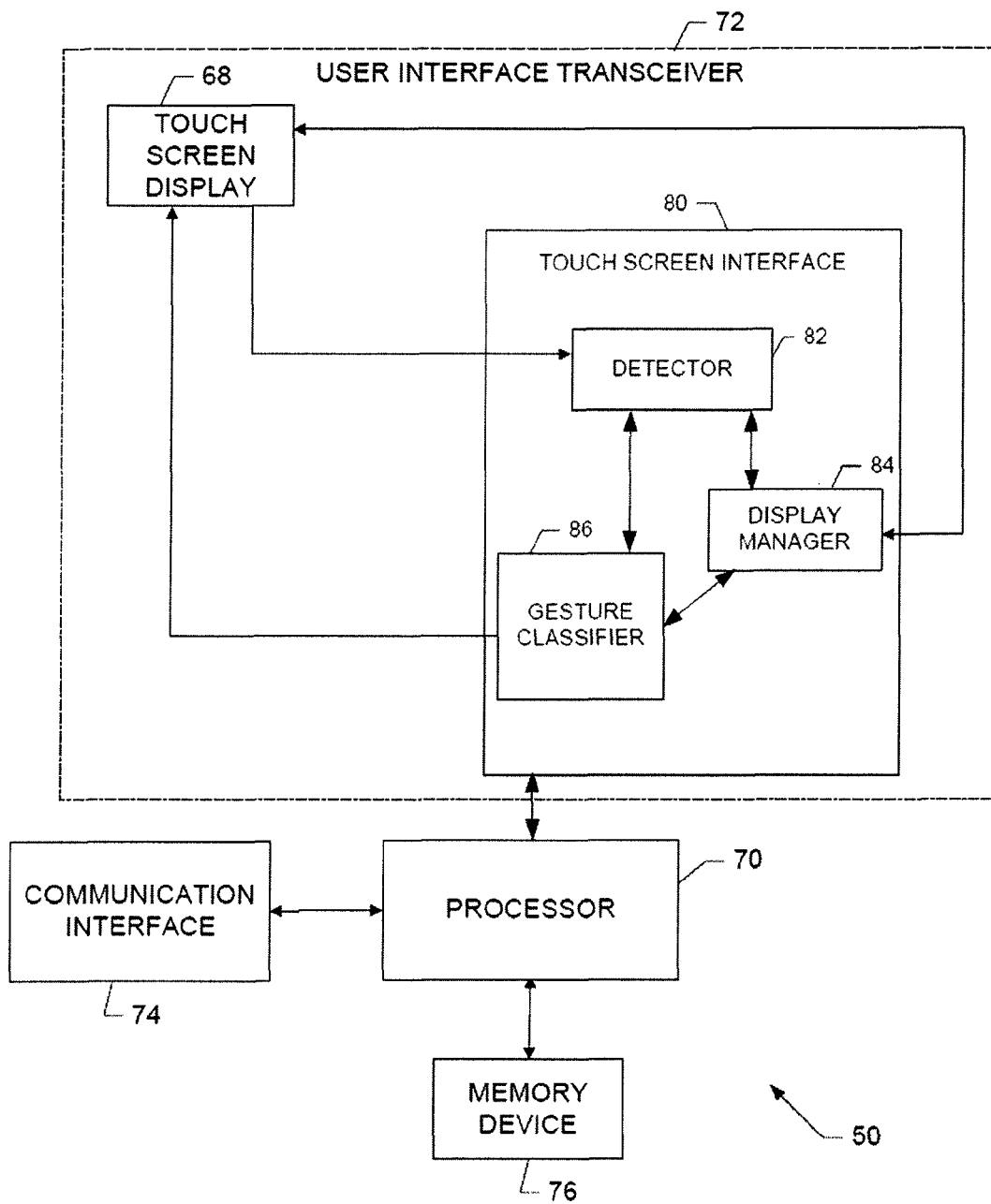
FIG. 2 illustrates a schematic block diagram of an apparatus for providing for a replicated user interface according to an example embodiment of the present invention.

It should also be noted that while FIG. 2 illustrates one example of a configuration of an apparatus for providing for a replicated user interface, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 for providing for a replicated user interface may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 72 may be in communication with the touch screen display 68 to receive touch inputs at the touch screen display 68 and to analyze and/or modify a response to such indications based on corresponding user actions that may be inferred or otherwise determined responsive to the touch inputs.

With continued reference to FIG. 2, in an example embodiment, the apparatus 50 may include a touch screen interface 80. The touch screen interface 80 may, in some instances, be a portion of the user interface transceiver 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an input in the form of a touch event at the touch screen display 68. As such, the touch screen interface 80 may be in communication with the touch screen display 68 to receive user inputs at the touch screen display 68 and to modify a response to such inputs based on corresponding user actions that may be inferred or otherwise determined responsive to the inputs. Following recognition of a touch event, the touch screen interface 80 may be configured to determine a classification of the touch event and provide a corresponding function based on the touch event in some situations.

In some embodiments, the touch screen interface 80 may include a detector 82, a display manager 84, and a gesture classifier 86. Each of the detector 82, the display manager 84, and the gesture classifier 86 may be any device or means embodied in either hardware or a combination of hardware and software configured to perform the corresponding functions associated with the detector 82, the display manager 84, and the gesture classifier 86, respectively, as described herein. In an exemplary embodiment, each of the detector 82, the display manager 84, and the gesture classifier 86 may be controlled by or otherwise embodied as the processor 70.

The detector 82 may be in communication with the touch screen display 68 to receive user inputs in order to recognize and/or determine a touch event based on each input received at the detector 82. A touch event may be defined as a detection of an object, such as a stylus, finger, pen, pencil, cellular telephone, digital camera, or any other mobile device (including the mobile terminal 10 shown in FIG. 1) or object, coming into contact with a portion of the touch screen display in a manner sufficient to register as a touch. In this regard, for example, a touch event could be a detection of pressure on the screen of the touch screen display 68 above a particular pressure threshold over a given area. Subsequent to each touch event, the detector 82 may be further configured to pass along the data corresponding to the touch event (e.g., location of touch, length of touch, number of objects touching, touch pressure, touch area, speed of movement, direction of movement, length of delay, frequency of touch, etc.) to the gesture classifier 86 for gesture classification. As such, the detector 82 may include or be in communication with one or more force sensors configured to measure the amount of touch pressure (e.g., force over a given area) applied as a result of a touch event, as an example.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, pinch event (e.g., a pinch in or pinch out), and/or the like.

Figure 4:
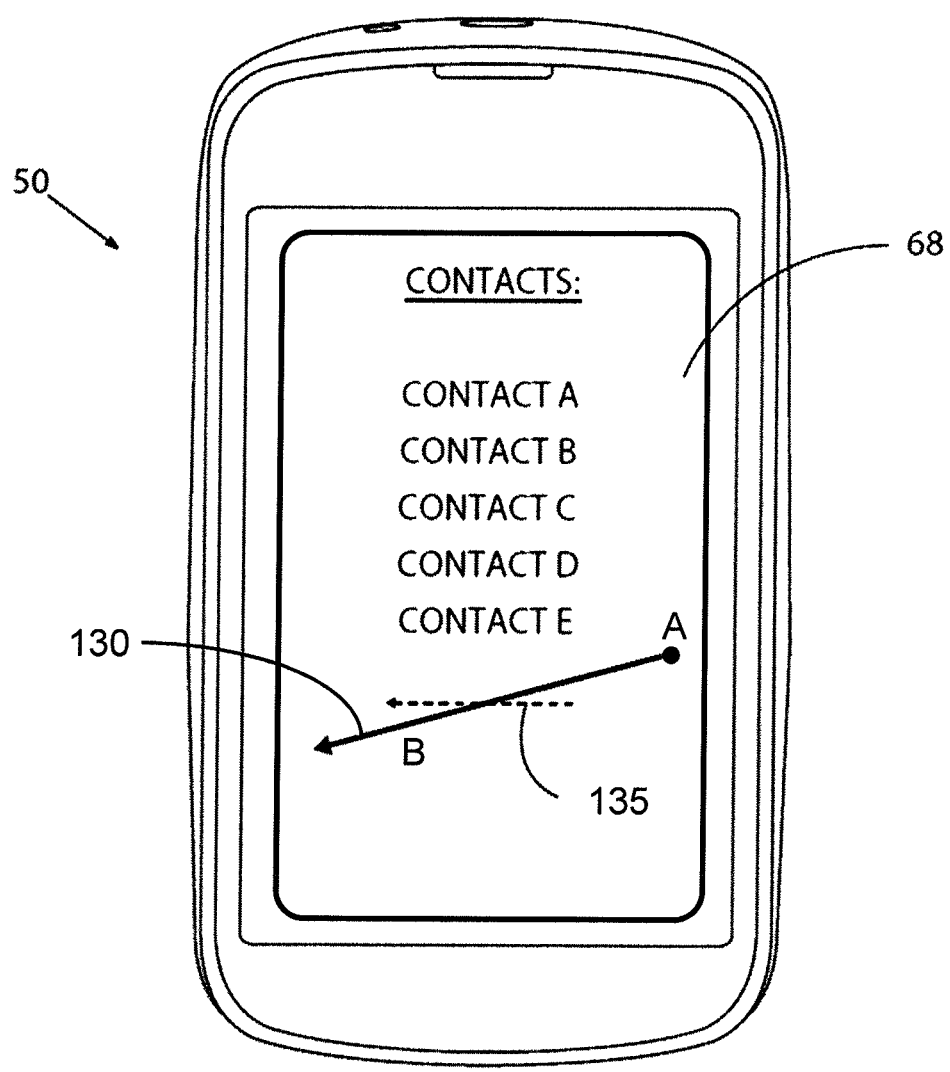
FIG. 4 illustrates a stroke gesture including a movement component according to an example embodiment of the present invention.

A touch may be defined as a touch event that impacts a single area (without or with minimal movement on the surface of the touch screen display 68) and then is removed. A multi-touch may be defined as multiple touch events sensed concurrently (or nearly concurrently). A stroke may be defined as a touch event followed immediately by motion of the object initiating the touch event while the object remains in contact with the touch screen display 68. In other words, the stroke may be defined by motion following a touch event thereby forming a continuous, moving touch event defining a moving series of instantaneous touch positions (e.g., as a drag operation or as a flick operation). As such, a stroke 130 (shown in FIG. 4) may include a contact component A (e.g., initial contact with the touch screen display 68), a movement component B (e.g., motion of the object contacting the touch screen display while the object remains in contact, represented by the arrow 130), with the direction of the movement component being the direction of motion of the object across the touch screen display. In some cases, the direction may be a nominal direction that is not identical to the direction of the movement component (e.g., a direction that is not the actual or instantaneous direction of the movement of the object across the touch screen display 68), as shown in FIG. 4 via the dashed arrow 135. Examples of a stroke include a "swipe-in" gesture, a "swipe-out" gesture, a "swipe-up" gesture, and a "swipe-down" gesture, as described in greater detail below. Multiple strokes and/or touches may be used to define a particular shape or sequence of shapes to define a character or symbol.

A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other.

The gesture classifier 86 may also be configured to communicate detection information regarding the recognition, detection, and/or classification of a touch event to the display manager 84. The display manager 84 may be configured to provide control over modifications made to that which is displayed on the touch screen display 68 based on the detection information received from the detector 82 and gesture classifications provided by the gesture classifier 86 in accordance with the responses prescribed for each respective gesture classification and implementation characteristic determined by the gesture classifier 86. In other words, the display manager 84 may configure the display (e.g., with respect to the content displayed and/or the user interface effects presented relative to the content displayed) according to the gesture classification and implementation characteristic classification determined for a given touch event that may be detected at the display.

Figure 5:
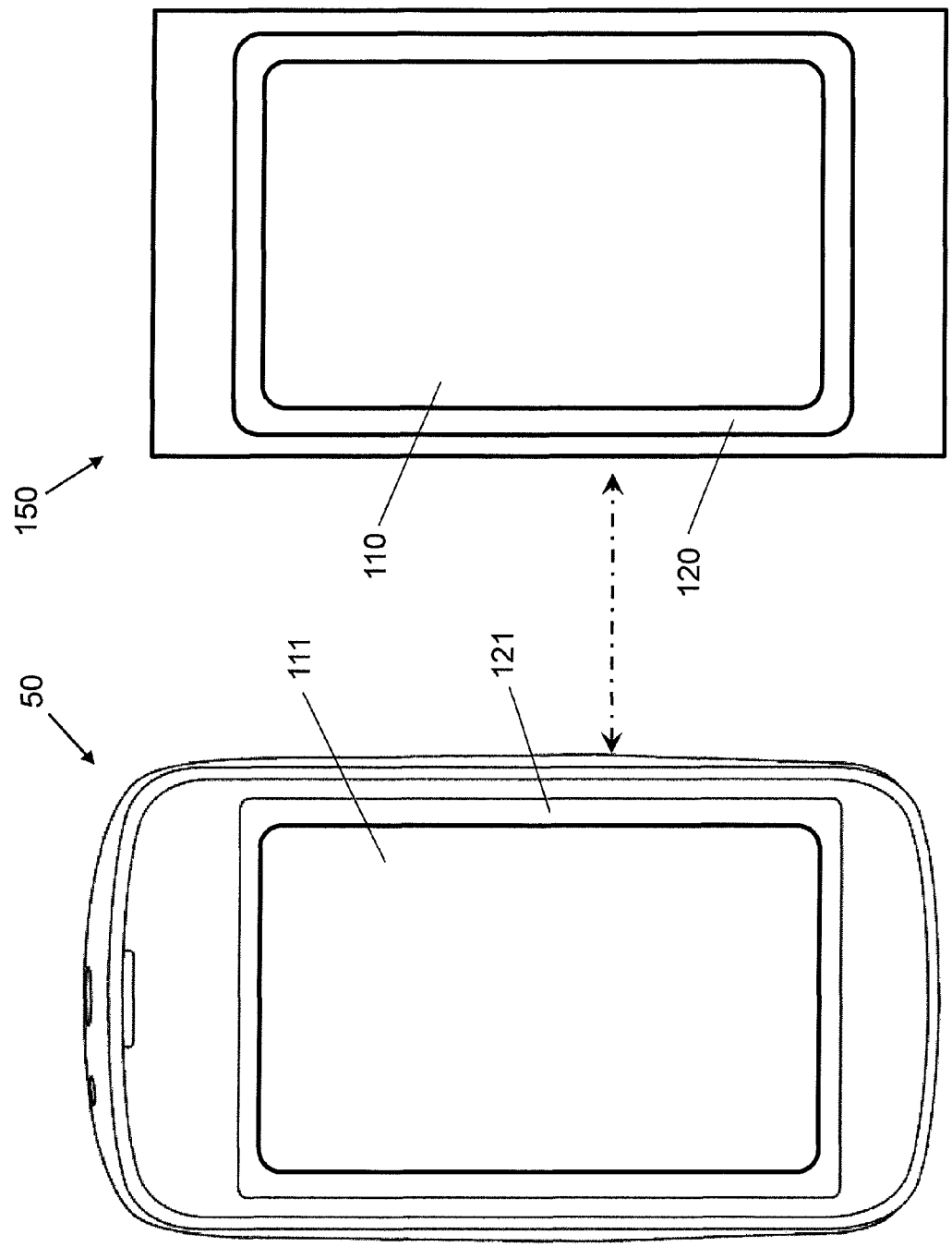
FIG. 5 illustrates an apparatus in communication with a remote user interface for providing for a replicated user interface according to an example embodiment of the present invention.

Turning now to FIG. 5, in general, an apparatus 50 is provided, such as an apparatus embodied by the mobile terminal 10 of FIG. 1 (e.g., a cellular phone) that has or is otherwise associated with a touch screen display 68. As described above, the apparatus 50 may comprise at least one processor (e.g., processor 70 of FIG. 2) and at least one memory (e.g., memory device 76 of FIG. 2) including computer program code. The at least one memory and the computer program code may be configured to, with the processor, cause the apparatus 50 to at least establish a communications link with a remote user interface 150, for example via the communication interface 74 of FIG. 2. For example, as noted above, the apparatus 50 may be embodied by the user's mobile device, such as the user's cellular telephone, and the remote user interface 150 may be the user interface of a fixed terminal, such a ticket-dispensing kiosk at a movie theater. As also noted above, however, the term "remote user interface" is a relative term, as any user interface that is being replicated by another device would be referred to as the remote user interface for purposes of explanation herein.

In some cases, the remote user interface 150 may comprise an active display area 110 and a boundary area 120 outside the active display area. The active display area 110 may, for example, be a centrally-located portion of the display in which content is displayed to the user. The boundary area 120 may be adjacent to and surrounding the active display area 110. In some cases, the boundary area 120 may be visually distinct from the active display area 110. For example, the boundary area 120 may be configured such that no content is displayed in the boundary area and may thus appear "dark" or "dead." In other cases, however, content that is displayed in the boundary area 120 may have a different appearance than content displayed in the active display area 110. For example, content displayed in the boundary area 120 may appear faded or partially obscured. In some cases, the boundary area 120 may display "simple" information, such as the presence of a communication connection, using a color band or other indication.

In any case, the apparatus 50 may be caused to determine whether the remote user interface 150 is configured to detect a user input at least partially received in the boundary area 120 outside the active display area 110 of the remote user interface. Although the embodiments depicted in the figures and used in the examples herein refer to a touch screen display 68 configured to receive touch inputs, the inputs may be provided to a non-touch display and/or via non-touch user input devices, such as a keypad or mouse. In this regard, the position of receipt of the non-touch input may refer to the location on the non-touch display corresponding to the location the input is applied (e.g., the position of an indicator, such as a mouse pointer), and the movement component of the input may be the motion of the indicator on the non-touch display, which, for example, is the result of a corresponding motion of a mouse on a horizontal surface, with the direction of the movement component being the direction of motion of the indicator across the non-touch display.

In response to a determination that the remote user interface 150 is configured to detect a user input at least partially received in the boundary area 120 of the remote user interface, the apparatus 50 may be caused to provide for a replicated active display area 111 and a replicated boundary area 121. In this way, a user input, such as a stroke 130 (FIG. 4), at least partially received in the replicated boundary area 111 and at least partially received in the replicated active display area 121 may invoke the execution of a predetermined operation.

Figure 6:
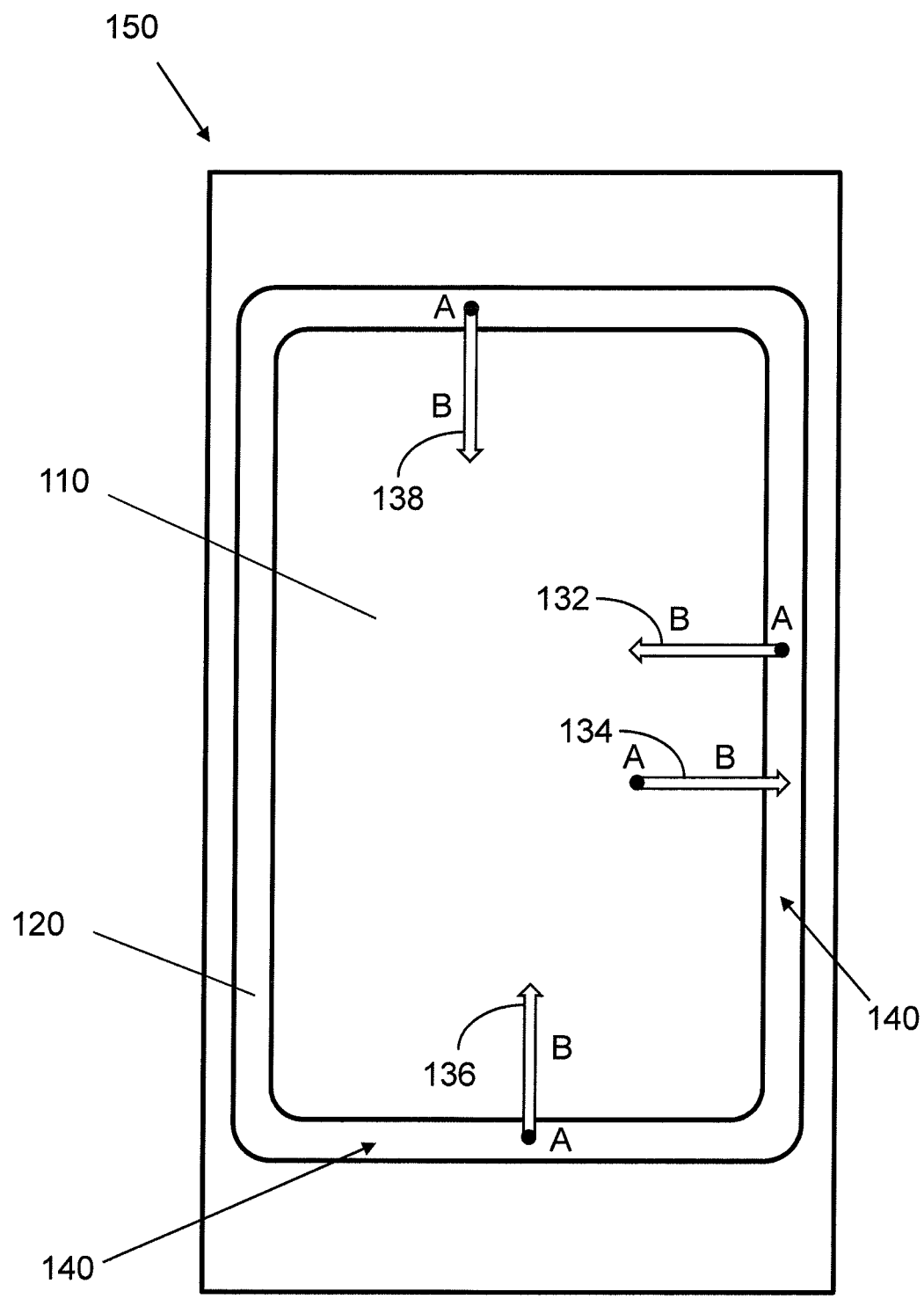
FIG. 6 illustrates various "swipe" gestures applied to a remote user interface according to an example embodiment of the present invention.

For example, with reference to FIG. 6, in some cases the remote user interface 150 may be configured to receive and execute certain operations in response to a user input, such as a stroke 130, that comprises a touch component A initiated at least partially in the boundary area 120 and comprising a movement component B at least partially received in the active display area 110. The stroke 130 may be, for example, a "swipe-in" gesture 132, a "swipe-up" gesture 136, or a "swipe-down" gesture 138, depending on which edge 140 of the boundary area 120 receives the initial touch component A and the direction of the movement component B. In other cases, the remote user interface 150 may be configured to receive and execute certain operations in response to a user input that comprises a touch component A initiated at least partially within the active display area 110 and comprising a movement component B at least partially received in the boundary area 120, such as a "swipe-out" gesture 134.

Figure 7A:
FIGS. 7A-7D illustrate screens representing various types of interactive content according to an example embodiment of the present invention.
Figure 7B:
Figure 7C:
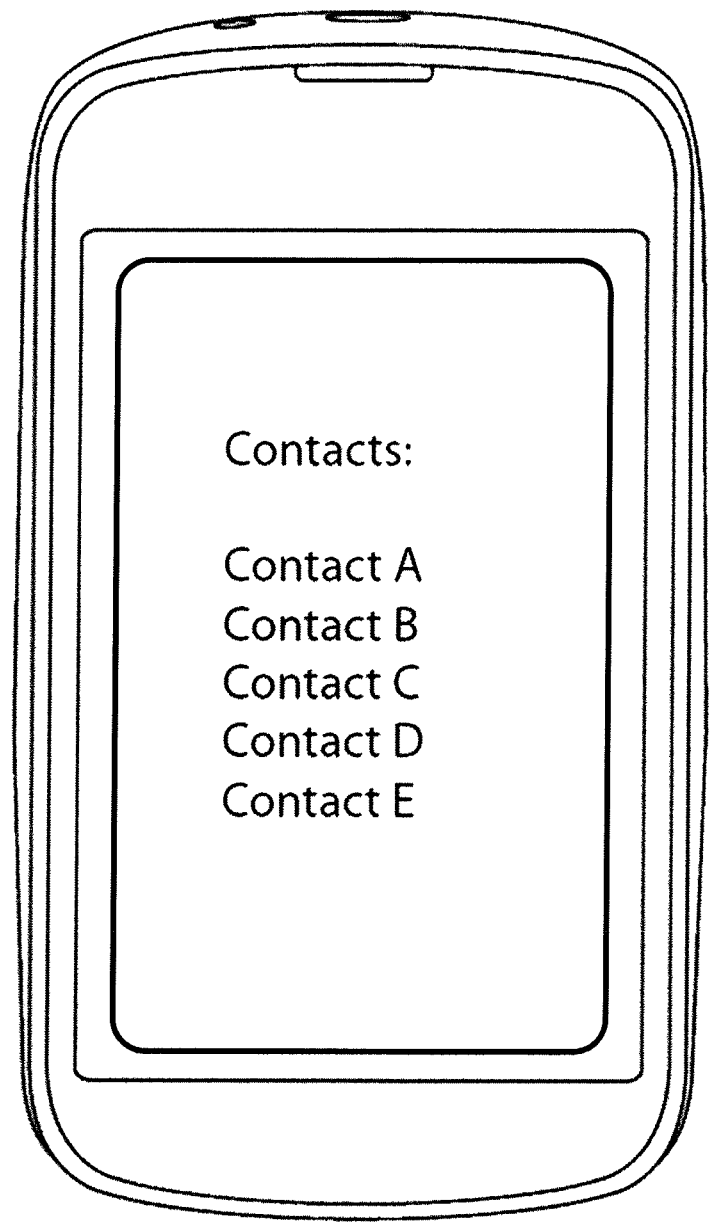

In this regard, a "swipe-in" gesture 132 may invoke the execution of a predetermined operation, such as a transition from a first screen comprising a first interactive content to a second screen comprising a second interactive content. The first screen may be, for example, a lock screen, such as the screen depicted in FIG. 7A. Receipt of a "swipe-in" gesture 132 may cause a transition from the lock screen of FIG. 7A to a home screen as shown in FIG. 7B, from which any of a number of programs may be launched by the user through selection of the corresponding program icon. Similarly, receipt of a "swipe-out" gesture 134 may invoke the execution of a different predetermined operation. For example, if a "swipe-out" gesture 134 is received while the user has a particular program open and displayed in the active display area (such as a program that displays the user's Contacts as shown in FIG. 7C), the "swipe-out" gesture may serve to close the program and transition from display of the program to display of the home screen of FIG. 7B. As additional examples, a "swipe-up" gesture 136 may cause a transition from a first screen of interactive content, such as the home screen of FIG. 7B, to a screen from a particular program, such as the Contacts screen of FIG. 7C, and a "swipe-down" gesture 138 may cause certain content to be displayed overlaying at least a portion of the previously displayed content, such as causing a list of the user's Reminders or appointments to be displayed in at least a portion of the display, at least partially obscuring whatever content was previously being displayed.

Thus, as noted above and described through the examples, receipt of the user input in certain areas of the boundary area 120 and/or the active display area 110 may cause a transition from a screen representing a first interactive content to a screen representing a second interactive content. As used herein, the term "interactive content" refers to information presented to the user via the display 68 (FIG. 2) or the display 28 (FIG. 1), either graphical (such as using icons, photos, illustrations, etc.) or textual, with which the user may interact in a particular way for a particular purpose. For example, as shown in the example depicted in FIG. 7A, the first interactive content may include information that is presented to the user as part of an idle or lock screen, such as the current time, the day of the week, the date, and a background image. The first interactive content may be configured such that the user can only interact with the content in a very limited manner, such as by shifting the content over to one side using a "swipe-in" gesture to change the state of the apparatus from idle to active (e.g. to access a home screen). Thus, the purpose of the first interactive content may be to provide certain information to the user (e.g., providing time and date information to the user) and to guard against the accidental entry of user input, such as through the user's incidental and unintentional contact with the display.

Continuing this example, the second interactive content may include data such as a contact list or a list of programs that may be launched by the user (e.g., the home screen shown in FIG. 7B). The second interactive content may be configured such that the user can more fully interact with the content, such as by selecting an icon to launch a program, expanding a displayed item to access details or further information, modify device settings, etc. Thus, the purpose of the second interactive content in this case may be to receive input from the user and to execute certain operations based on the input received.

Accordingly, in some cases, the first interactive content may comprise different information than the second interactive content. The second interactive content may, for example, include additional information as compared to the first interactive content, such as icons for launching a program to play music, an indication of battery life, and an indication of the current weather, etc.

Alternatively or additionally, the first interactive content may be configured to allow the user to interact with the first interactive content according to a first set of rules, and the second interactive content may be configured to allow the user to interact with the second interactive content according to a second set of rules. With reference to the lock screen of FIG. 7A, for example, the first screen may be configured such that only a "swipe-in" gesture is registered as an input that causes a second screen to be accessed and displayed. Other inputs that do not satisfy these criteria, such as a simple touch, multi-touch, pinch, tap, press, or long press (among others) would not be recognized as inputs and would be disregarded by the apparatus. Similarly, the second screen (e.g., the screen of FIG. 7B) may be configured such that only touch events received at certain locations (e.g., corresponding to the location of a particular program icon) of the touch screen display are registered as inputs. Moreover, the operation executed upon receipt of the input may depend on the location at which the touch event is received (e.g., which program to open). Thus, a touch event in a blank area of the screen, for example, where no icon is displayed may not cause any operation to be executed.

As described above and depicted in the figures, the particular arrangement and presentation of interactive content (whether the same or different interactive content) is described herein as being provided via "screens" that are displayed to the user upon the display 68 of the apparatus. In other words, each screen presents to the user a collection of content elements that make up the respective interactive content. In FIG. 7A, for example, the displayed time (10:49) is a content element of the displayed screen and is part of the represented interactive content.

Figure 7D:

Although the examples described above make reference to a transition from a first screen of first interactive content to a second screen of second interactive content, in some cases, depending on the user input, a second screen may be accessed that does not contain different interactive content with respect to the first screen. For example, a user input received entirely within the active display area 110 may cause a transition between a screen displaying the user's list of Contacts (such as shown in FIG. 7C) and a screen displaying details of a particular Contact (such as shown in FIG. 7D). In this example, the transition would be between a first screen displaying a first interactive content to a second screen displaying content related to the first interactive content, in that the content from both screens was generated by, for example, the same program (e.g., a contacts application).

Turning again to FIGS. 5 and 6, in cases as described above in which the apparatus 50 determines that the remote user interface 150 is configured to detect a user input at least partially received in the boundary area 120 of the remote user interface, the apparatus may be caused to provide for the replicated active display area 111 and the replicated boundary area 121 such that a user input at least partially received in the replicated boundary area and at least partially received in the replicated active display area invokes execution of a predetermined operation, allowing the apparatus to execute the same or similar operations as are capable of being executed by the remote user interface. Thus, a user input comprising a touch component A initiated at least partially in the replicated boundary area 111 and comprising a movement component at least partially received in the replicated active display area 121 may invoke execution of the predetermined operation (e.g., the predetermined operation that would have been invoked via application of the same user input on the remote user interface 150). Accordingly, in some cases, the predetermined operation may comprise a transition from a first screen comprising a first interactive content to a second screen comprising a second interactive content, whereas in other cases the predetermined operation may comprise closing a program displayed in the replicated active display area 111, or some other operation, as described above with respect to the remote user interface 150.

As described above, in some embodiments, the remote user interface 150 may be configured such that the active display area 110 displays content and the boundary area 120 does not display content (e.g., appears dark). The apparatus 50 may likewise be configured such that the replicated active display area 111 is configured to display content and the replicated boundary area 121 is configured not to display content, thereby mimicking the configuration of the active display area 110 and the boundary area 120 of the remote user interface 150. In some cases, however, both the replicated active display area 111 and the replicated boundary area 121 may be configured to display content, at least to some extent, regardless of the configuration of the corresponding areas of the remote user interface 150.

Depending on the configuration and functionality of the display 68 of the apparatus (FIG. 2), the apparatus may be caused to replicate the remote user interface 150 in multiple ways. For example, the at least one memory and the computer program code may be configured to, with the processor, cause the apparatus to provide for the replicated active display area 111 by configuring a portion of an existing active display area (of the apparatus 50) to serve as the replicated active display area and configuring another portion of the existing active display area to serve as the replicated boundary area 121. In other words, a portion of the existing active display area 115 of the apparatus 50, which is smaller in area than the entire existing active display area, may be configured to serve as the replicated active display area 111, and the remainder of the existing active display area (or at least part of the remainder) may be configured to serve as the replicated boundary area 121, as shown in FIG. 8A.

In other cases, however, the at least one memory and the computer program code may be configured to, with the processor, cause the apparatus to provide for the replicated active display area 111 by configuring an existing active display area 115 to serve as the replicated active display area and to provide for the replicated boundary area 121 at least partially surrounding the replicated active display area, as illustrated in FIG. 8B. Thus, in the example of FIG. 8B, an area of the display 68 of the apparatus that is not used as the replicated active display area 115 is configured to serve as the replicated boundary area 121.

FIG. 9 illustrates flowcharts of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one embodiment of a method for providing for a replicated user interface, as shown in FIG. 9, includes establishing a communications link with a remote user interface at Block 200, determining whether the remote user interface is configured to detect a user input at least partially received in a boundary area outside an active display area of the remote user interface at Block 210, and providing for a replicated active display area and a replicated boundary area in response to a determination that the remote user interface is configured to detect a user input at least partially received in the boundary area of the remote user interface at Block 220. As described above, a user input at least partially received in the replicated boundary area and at least partially received in the replicated active display area may invoke execution of a predetermined operation.

In some cases, providing for the replicated active display area may include configuring a portion of an existing active display area to serve as the replicated active display area and configuring another portion of the existing active display area to serve as the replicated boundary area at Block 230. Alternatively, providing for the replicated active display area may include configuring an existing active display area to serve as the replicated active display area and providing for the replicated boundary area at least partially surrounding the replicated active display area at Block 240.

The replicated active display area may be configured to display content, and the replicated boundary area may be configured not to display content, as noted above. Moreover, user input comprising a touch component initiated at least partially in the replicated boundary area and comprising a movement component at least partially received in the replicated active display area may invoke execution of the predetermined operation. In this regard, the predetermined operation may comprise a transition from a first screen comprising a first interactive content to a second screen comprising a second interactive content, or the predetermined operation may comprise closing a program displayed in the replicated active display area, among many other types of operations as described above.

In some embodiments, certain ones of the operations above may be modified or further amplified as described below. Furthermore, in some embodiments, additional optional operations may be included, some examples of which are shown in dashed lines in FIG. 9. Modifications, additions, or amplifications to the operations above may be performed in any order and in any combination.

In an example embodiment, an apparatus for performing the method of FIG. 9 above may comprise a processor (e.g., the processor 70 of FIG. 2) configured to perform some or each of the operations (200-240) described above. The processor may, for example, be configured to perform the operations (200-240) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operation 200 may comprise, for example, the communication interface 74, the processor 70, the memory device 76, and/or a device or circuit for executing instructions or executing an algorithm for processing information as described above. Examples of means for performing operation 210 may comprise, for example, the processor 70, the memory device 76, and/or a device or circuit for executing instructions or executing an algorithm for processing information as described above. Examples of means for performing operations 220, 230, and 240 may comprise, for example, the user interface transceiver 72, the processor 70, the memory device 76, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
    establish a communications link with a remote user interface;
    determine whether the remote user interface is configured to detect a user input at least partially received in a boundary area outside an active display area of the remote user interface; and
    provide for a replicated active display area and a replicated boundary area in response to a determination that the remote user interface is configured to detect a user input at least partially received in the boundary area of the remote user interface,
    wherein a user input at least partially received in the replicated boundary area and at least partially received in the replicated active display area invokes execution of a predetermined operation.

2. The apparatus of claim 1, wherein the at least one memory and the computer program code are further configured to, with the processor, cause the apparatus to provide for the replicated active display area by configuring a portion of an existing active display area to serve as the replicated active display area and configuring another portion of the existing active display area to serve as the replicated boundary area.

3. The apparatus of claim 1, wherein the at least one memory and the computer program code are further configured to, with the processor, cause the apparatus to provide for the replicated active display area by configuring an existing active display area to serve as the replicated active display area and to provide for the replicated boundary area at least partially surrounding the replicated active display area.

4. The apparatus of claim 1, wherein the replicated active display area is configured to display content and the replicated boundary area is configured not to display content.

5. The apparatus of claim 1, wherein a user input comprising a touch component initiated at least partially in the replicated boundary area and comprising a movement component at least partially received in the replicated active display area invokes execution of the predetermined operation.

6. The apparatus of claim 5, wherein the predetermined operation comprises a transition from a first screen comprising a first interactive content to a second screen comprising a second interactive content.

7. The apparatus of claim 5, wherein the predetermined operation comprises closing a program displayed in the replicated active display area.

8. A method comprising:
    establishing a communications link with a remote user interface;
    determining whether the remote user interface is configured to detect a user input at least partially received in a boundary area outside an active display area of the remote user interface; and
    providing for a replicated active display area and a replicated boundary area in response to a determination that the remote user interface is configured to detect a user input at least partially received in the boundary area of the remote user interface,
    wherein a user input at least partially received in the replicated boundary area and at least partially received in the replicated active display area invokes execution of a predetermined operation.

9. The method of claim 8, wherein providing for the replicated active display area comprises configuring a portion of an existing active display area to serve as the replicated active display area and configuring another portion of the existing active display area to serve as the replicated boundary area.

10. The method of claim 8, wherein providing for the replicated active display area comprises configuring an existing active display area to serve as the replicated active display area and providing for the replicated boundary area at least partially surrounding the replicated active display area.

11. The method of claim 8, wherein the replicated active display area is configured to display content and the replicated boundary area is configured not to display content.

12. The method of claim 8, wherein a user input comprising a touch component initiated at least partially in the replicated boundary area and comprising a movement component at least partially received in the replicated active display area invokes execution of the predetermined operation.

13. The method of claim 12, wherein the predetermined operation comprises a transition from a first screen comprising a first interactive content to a second screen comprising a second interactive content.

14. The method of claim 12, wherein the predetermined operation comprises closing a program displayed in the replicated active display area.

15. A computer program product comprising at least one non-transitory computer-readable storage medium having computer-executable program code portions stored therein, the computer-executable program code portions comprising program code instructions for:
    establishing a communications link with a remote user interface;
    determining whether the remote user interface is configured to detect a user input at least partially received in a boundary area outside an active display area of the remote user interface; and
    providing for a replicated active display area and a replicated boundary area in response to a determination that the remote user interface is configured to detect a user input at least partially received in the boundary area of the remote user interface,
    wherein a user input at least partially received in the replicated boundary area and at least partially received in the replicated active display area invokes execution of a predetermined operation.

16. The computer program product of claim 15, wherein providing for the replicated active display area comprises configuring a portion of an existing active display area to serve as the replicated active display area and configuring another portion of the existing active display area to serve as the replicated boundary area.

17. The computer program product of claim 15, wherein providing for the replicated active display area comprises configuring an existing active display area to serve as the replicated active display area and providing for the replicated boundary area at least partially surrounding the replicated active display area.

18. The computer program product of claim 15, wherein the replicated active display area is configured to display content and the replicated boundary area is configured not to display content.

19. The computer program product of claim 15, wherein a user input comprising a touch component initiated at least partially in the replicated boundary area and comprising a movement component at least partially received in the replicated active display area invokes execution of the predetermined operation.

20. The computer program product of claim 18, wherein the predetermined operation comprises a transition from a first screen comprising a first interactive content to a second screen comprising a second interactive content or closing a program displayed in the replicated active display area.

* * * * *